(12) United States Patent
Gries

(10) Patent No.: US 11,829,129 B2
(45) Date of Patent: Nov. 28, 2023

(54) SIMULATION OF CONTROL DEVICE COMMUNICATION BETWEEN A CONTROL DEVICE TO BE TESTED AND AT LEAST ONE FURTHER CONTROL DEVICE

(71) Applicant: dSPACE GmbH, Paderborn (DE)

(72) Inventor: Matthias Gries, Paderborn (DE)

(73) Assignee: DSPACE GMBH, Paderborn (DE)

( * ) Notice: Subject to any disclaimer, the term of this patent is extended or adjusted under 35 U.S.C. 154(b) by 0 days.

(21) Appl. No.: 17/908,250

(22) PCT Filed: Mar. 8, 2021

(86) PCT No.: PCT/EP2021/055749
§ 371 (c)(1),
(2) Date: Aug. 31, 2022

(87) PCT Pub. No.: WO2021/185612
PCT Pub. Date: Sep. 23, 2021

(65) Prior Publication Data
US 2023/0124300 A1 Apr. 20, 2023

(30) Foreign Application Priority Data
Mar. 16, 2020 (DE) .......................... 102020107141.8

(51) Int. Cl.
*G05B 23/02* (2006.01)
*G05B 17/02* (2006.01)

(52) U.S. Cl.
CPC ......... *G05B 23/0256* (2013.01); *G05B 17/02* (2013.01); *G05B 2219/23445* (2013.01); *G05B 2219/23446* (2013.01)

(58) Field of Classification Search
CPC ................ G05B 23/0256; G05B 17/02; G05B 2219/23445; G05B 2219/23446
See application file for complete search history.

(56) References Cited

U.S. PATENT DOCUMENTS

| 7,369,983 B2 | 5/2008 | Sato et al. |
| 7,370,317 B2 | 5/2008 | Cabrera et al. |

(Continued)

FOREIGN PATENT DOCUMENTS

| DE | 102016101853 A1 | 8/2017 |
| DE | 102016102920 A1 | 8/2017 |

(Continued)

OTHER PUBLICATIONS

English translation of DE-102017211433-A1 (Year: 2019).*

*Primary Examiner* — Shon G Foley
(74) *Attorney, Agent, or Firm* — LEYDIG, VOIT & MAYER, LTD.

(57) ABSTRACT

A method for generating an executable simulation program and simulating control device communication between a control device to be tested and at least one further control device includes: transferring a description of transmit and receive interfaces into a database; identifying interfaces of the control device to be tested; generating interfaces of the at least one further control device for each interface of the control device to be tested; storing the generated interface elements in the database; providing a configuration for the simulation of the control device communication between the control device to be tested and the at least one further control device; generating the executable simulation program; and simulating the control device communication.

15 Claims, 3 Drawing Sheets

(56) References Cited

U.S. PATENT DOCUMENTS 10,496,532 B1  12/2019  Kaitha
2018/0101501 A1* 4/2018  Fischer ................ G05B 19/042

FOREIGN PATENT DOCUMENTS

| | | | |
|---|---|---|---|
| DE | 102017211433 A1 * | 1/2019 | ............. G05B 17/02 |
| EP | 2990892 A1 | 3/2016 | |
| JP | 2005209209 A | 8/2005 | |
| JP | 2012073778 A | 4/2012 | |
| JP | 2016177696 A | 10/2016 | |
| WO | WO 2005086449 A1 | 9/2005 | |

* cited by examiner

SIMULATION OF CONTROL DEVICE COMMUNICATION BETWEEN A CONTROL DEVICE TO BE TESTED AND AT LEAST ONE FURTHER CONTROL DEVICE

CROSS-REFERENCE TO PRIOR APPLICATIONS

This application is a U.S. National Phase application under 35 U.S.C. § 371 of International Application No. PCT/EP2021/055749, filed on Mar. 8, 2021, and claims benefit to German Patent Application No. DE 102020107141.8, filed on Mar. 16, 2020. The International Application was published in German on Sep. 23, 2021 as WO 2021/185612 A1 under PCT Article 21(2).

FIELD

The invention relates to a method, to a system, and to a computer program product for generating an executable simulation program and for simulating control device communication between a control device to be tested and at least one further control device.

BACKGROUND

In the modern world, many different technical devices that regularly exchange data are used. The communication among the devices is generally controlled by a control device. Control devices of this kind are able to take care of the communication of many different devices and not only specific other devices. To communicate with a device, the control device has to have and be able to process the relevant interfaces and protocols for each counterpart device. In other words, the control device has to have instructions specifying to it which data it should send, and how, in order to communicate with another device via a transmit interface, and how it can evaluate data received via a receive interface. It is desirable for a control device to be able to communicate with as many different devices as possible.

Before a control device is brought to market, for example in a vehicle, it has to be ensured that the communication with the devices selected in accordance with the control device specifications functions perfectly. Normally, therefore, a control device is tested before being mass produced. A real-world test is, however, often very complex, or potentially impossible, because communication participants are not yet actually available, so the communication with all possible devices is often simulated instead. For the purposes of this simulation and the later communication, relevant information on the simulated devices is required. The required information is generally available in the form of a so-called "communication matrix", which comprises a description of all the transmit and receive interfaces of a device or of the group of devices as a whole. For each control device to be tested, there is a specific communication matrix (potentially as part of the overall communication matrix) comprising the instructions for the communication between the control device to be tested and other control devices.

Some communication matrices are created by vehicle manufacturers for an entire vehicle. However, to test an individual control device, e.g., at the premises of the control device supplier, a communication matrix may not yet be available in full, or may only be available for the individual control device to be tested, so information that is important for testing the communication between the control device and other control devices is not available. Usually, this kind of information for the communication matrices then has to be separately created manually and input into the communication matrix by the user, in particular a so-called "hardware-in-the-loop tester". In the process, the tester has to take account not only of the device model of the bus system being used, but also of the network technology being used and of standard description specifications. The interfaces described by the communication matrices, or the description of said interfaces, are specified by various standards, but there may be different mapping specifications for one and the same interface due to amendments to the standards.

In addition, the tester may not be authorized to alter the communication matrix of a control device or of the group of control devices as a whole due to purchasing rights or contractual agreements.

SUMMARY

In an exemplary embodiment, the present invention provides a method for generating an executable simulation program and simulating control device communication between a control device to be tested and at least one further control device. The control device to be tested has a description of the transmit and receive interfaces of the control device to be tested. The method includes: transferring the description of the transmit and receive interfaces into a database; identifying, by the database, from the description, the interfaces of the control device to be tested; generating a receive interface element as a receive interface of the at least one further control device for each identified transmit interface of the control device to be tested; generating a transmit interface element as a transmit interface of the at least one further control device for each receive interface of the control device to be tested; storing the generated interface elements in the database; providing, by the database, a configuration for the simulation of the control device communication between the control device to be tested and the at least one further control device, wherein the configuration comprises the generated interface elements; generating an executable simulation program for the control device communication between the control device to be tested and the at least one further control device using the configuration; and simulating the control device communication between the control device to be tested and the at least one further control device using the simulation program.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
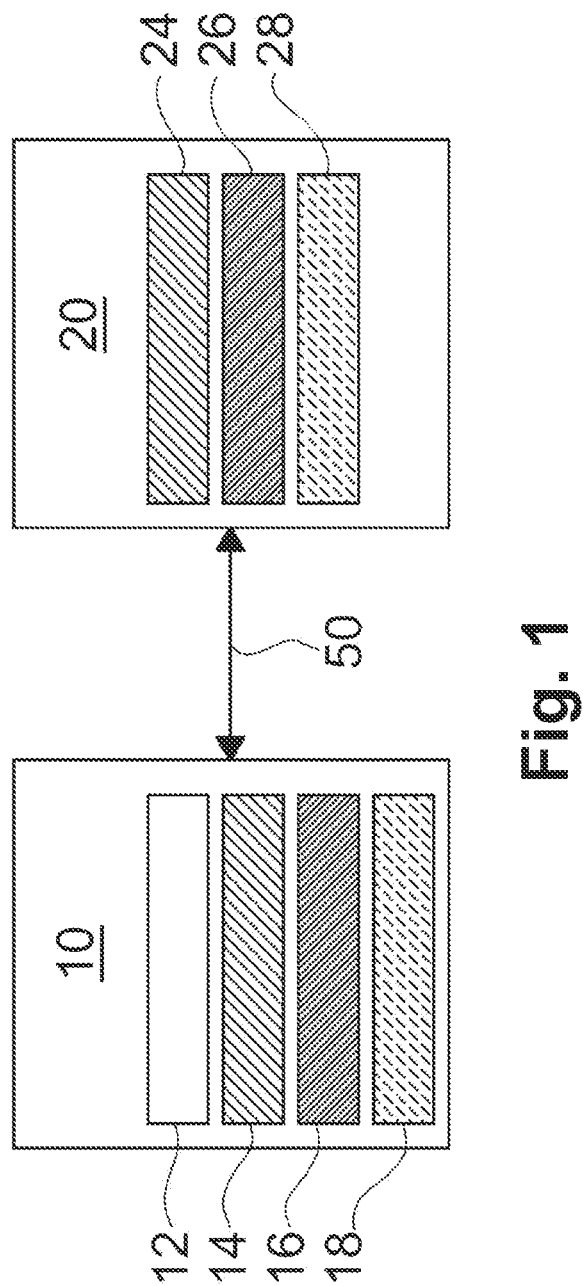
FIG. 1 is a schematic illustration of simulated control device communication between a control device to be tested and a further control device.

Exemplary embodiments simplify the simulation of control device communication and minimize the susceptibility to errors and the work required to generate a simulation environment.

In a first aspect, the invention relates to a method for generating an executable simulation program and simulating control device communication between a control device to be tested and at least one further control device. For the control device to be tested, a description of the transmit and receive interfaces of the control device to be tested is available. The method comprises the following steps:

- transferring the description of the transmit and receive interfaces into a database,
- identifying, by the database, from the description, the interfaces of the control device to be tested,
- generating a receive interface element as a receive interface of the at least one further control device for each identified transmit interface of the control device to be tested,
- generating a transmit interface element as a transmit interface of the at least one further control device for each receive interface of the control device to be tested,
- storing the generated interface elements in the database,
- providing, by the database, a configuration for the simulation of the control device communication between the control device to be tested and the at least one further control device, the configuration including the interfaces of the control device to be tested and the generated interface elements,
- generating an executable simulation program for the control device communication between the control device to be tested and the at least one further control device using the configuration, and
- simulating the control device communication between the control device to be tested and the at least one further control device using the simulation program.

Within the context of the present invention, a distinction is drawn between a control device to be tested and a further control device. The control device to be tested is preferably an automobile control device that is intended to communicate with a multiplicity of further devices when in use later on. By way of example, a control device of this kind is installed in a vehicle and controls the communication of further devices in the vehicle, such as the on-board computer, the navigation device, the brake controller of an anti-lock braking system (ABS), the light controller, the fuel pump controller, or other devices in a typical vehicle. The control device to be tested can be real or virtual. Equally, a bus used within the context of the invention can be real or virtual. A virtual control device is effectively a control device precursor implemented in software and generally already contains the final production code. However, it does not yet require the actual hardware of the control device even though the future operating system is generally already simulated and real-world planning behavior is emulated on the basis of the time and trigger information defined for the functionalities, so the virtual control device can be connected, for example, to a simulated bus (www.dspace.com/de/gmb/home/news/engineers-insights/blog-virtuals-ecus-1808.cfm).

To test the control device to be tested, the communication with one or more further control devices is tested by simulating the communication. The at least one further control device can thus include one further control device or a plurality of further control devices.

The terms interface and interface element, in particular generated interface elements, are used within the context of the present invention. In principle, interfaces and interface elements are communication functions, corresponding function calls, or specifications of communication elements such as message (packets) and/or the properties thereof, such as message types, data types, or ports that a control device uses to exchange data with another control device. Interface elements, and in particular generated interface elements, differ from interfaces in that they form the counterparts to the interfaces of the control device to be tested and are thus available purely virtually, i.e., without any physically present control device. The communication with the at least one further control device is simulated, so the at least one further control device need not be physically present in order to simulate the control device communication. The same also applies to the control device to be tested, which need not be physically available in its entirety.

The description of the transmit and receive interfaces of the control device to be tested is preferably a communication description and is available particularly preferably in the form of communication matrix. A communication matrix can, for example, be used in the form of an eXtensible Markup Language (XML) schema. A typical communication matrix can comprise up to 100,000 or more elements describing the interfaces of each control device.

In principle, the database can be any database that comprises the required information to be able to input standard communication descriptions. In other words, this information is, for example, information related to the AUTomotive Open System ARchitecture (AUTOSAR) standard and/or other communication standards. In addition, the communication descriptions for control devices to be tested can be stored in the database, preferably as communication matrices, for different standards and different devices to be simulated.

Particularly preferably, after being loaded, the descriptions are stored in the database in an abstracted form such that the descriptions can be used regardless of the version of the standard being used. The interfaces of the control device to be tested are preferably also stored in the database in abstracted form.

A standard (also referred to here as a communication technology), for example AUTOSAR, can be amended and/or updated several times a year. By way of example, one and the same interface is mapped differently in a communication matrix in accordance with the AUTOSAR 3.1.4 standard compared with a communication matrix in accordance with the AUTOSAR 4.3.1 standard. Abstracting the interface description, for example in the form of a version-independent designation, allows for a version-independent configuration.

Advantageously, abstracting the descriptions and mapping the abstracted descriptions into the generated interface elements simplifies the generation of the executable simulation program. As a result of the abstracting, there is no need to store in the database all the possible descriptions for all the possible communication technology versions, thereby reducing the necessary volume of the database.

Preferably, a processing unit is provided, for example the processor unit of a personal computer (PC), for abstracting the descriptions of the interfaces, generating the interface elements, and/or carrying out other steps of the method.

According to the present invention, the description of the control device to be tested is first transferred to the database. In other words, the database receives all the information for the control device to be tested in the form of a corresponding description that is supplied together therewith for the control device.

The transferred description is analyzed by the database, which comprises comparing the received information with the entries in the database. The database checks whether the received information matches one or more database entries and, in doing so, identifies the interfaces of the control device to be tested.

If the interfaces of the control device to be tested are known, the database can select the matching entries, preferably from its entries, for counterpart interfaces. For each transmit interface of the control device to be tested, at least one entry relating to a receive interface that corresponds to the relevant transmit interface is searched for, and for each receive interface of the control device to be tested, at least one entry relating to a transmit interface that corresponds to the relevant receive interface is searched for. From the entries found, the entries that relate to the interfaces of the at least one further control device are then selected.

From the entries then remaining, receive interface elements and transmit interface elements are generated as interfaces, in particular as counterpart interfaces of the at least one further control device to the interfaces of the control device to be tested.

The generation of the interface elements by the database simplifies the simulation process per se as this step is carried out automatically. There is no need for a user, who might introduce errors in the complex communication matrices. On the contrary, the automatic generation of the interfaces ideally does not require any interaction from the user at all, thus reducing the staff costs involved with generating the simulation. Preferably, the automatic creation of the interface elements does not alter the communication matrix either, but rather the interface elements are generated directly as elements, preferably abstracted elements, of the database.

In addition, generating the interface elements makes it possible to simulate at least one further control device whose description is not yet in existence, is inaccessible, or is not yet available.

Moreover, the user/tester can, in a simple manner, test the communication of control devices that are already on the market but are intended to communicate with new control devices.

Storing the generated interfaces preferably comprises storing the generated interfaces in a memory, preferably a temporary memory, of the database.

In a subsequent step, the creation of a simulation program is prepared by providing a configuration for the simulation of the control device communication. The configuration specifies the interfaces, counterpart interfaces, settings, boundary parameters, and other important information that are important for creating the simulation program. Since the configuration also comprises the generated interface elements and these have been generated in a manner specific to the description of the transmit and receive interfaces of the control device to be tested, the configuration determines the boundary conditions for the simulation of the control device communication between the control device to be tested and the at least one further control device. The provided configuration generally cannot be used for other control devices, for example another control device to be tested and/or for other further control devices. The provided configuration is specifically tailored to the combination, determined at the outset, of the control device to be tested and the at least one further control device, but it can be expanded.

Generating the executable simulation program for the control device communication comprises generating a code via a corresponding code generator for the simulation program on the basis of the communication description, the interfaces contained therein, and other information. The simulation program created in this way can then be executed using the control device to be tested, as a result of which the communication between the control device to be tested and the at least one further control device is simulated. Alternatively, the simulation is carried out on a computer (i.e., a data processing unit) on which the database and the computer program for carrying out the method according to the invention are also found, or on a simulator connected to the computer, e.g., a hardware-in-the-loop (HIL) simulator.

In one embodiment, the interface elements are generated only for interfaces for which no counterpart interfaces have been found during the identification of the interfaces of the control device to be tested.

In this embodiment, the database checks whether at least one of the entries found corresponds to the communication description of a matching counterpart interface. If this is the case, no interface element is generated for the entry in question since an interface of this kind already exists.

Advantageously, checking correlations between the interface entries reduces the work required to produce the configuration and the complexity of the configuration since duplicate descriptions of interfaces in the configuration are avoided.

In a further embodiment, the generated interface elements are labeled as automatically generated interface elements after being stored in the database.

By way of example, but without being limited hereto, the label can comprise graphical highlighting, in particular a colored marker in a graphical user interface (GUI), an entry in a special list of generated interface elements, a grouped depiction of the generated interface elements, or by placing in the database a bit that is linked to the generated interface element.

Advantageously, it is indicated to a user which description of one of the interfaces has been automatically generated in the configuration and/or in the database and which description has been received from the control device to be tested. The label thus improves the handling of the configuration and of the simulation.

In a further embodiment, the method furthermore comprises receiving a selection of designated interface elements, with only the interface elements designated in the selection being generated.

For example, before the interface elements are generated, a user can specify which interface elements are to be generated. The control device to be tested can, for example, be intended only for communication with a selection of further control devices. In this case, the communication has to be simulated only for the selection of control devices, and for this purpose it is necessary to generate only the interface elements for the control devices that correspond to the selection. In a further example, only certain interfaces that can be specified by the selection are to be tested.

Advantageously, receiving the selection and generating interface elements in accordance with the selection simplifies the generation of the simulation program and reduces the complexity of the configuration.

In one embodiment, for a simulation of the at least one further control device, the interface elements of the at least one further control device are generated as interfaces of restbus control devices for an HIL simulation.

Hardware-in-the-loop (HIL) refers to a process in which a control device to be tested is connected to a simulator via its inputs and outputs, whereby the simulator simulates the environment of the control device and further control devices that are not physically present and with which the control device to be tested would need to communicate in real life.

In a further embodiment, the interface elements of the at least one further control device are generated for a rapid control prototyping simulation for a function of the control device to be tested.

Rapid control prototyping refers to a computer-assisted design method for quickly developing open-loop and closed-loop control systems.

In a further embodiment, the generated interface elements of the at least one further control device are grouped in accordance with a communication technology. The communication technology can in particular comprise Controller Area Network (CAN) clusters, Local Interconnect Network (LIN) clusters, or Ethernet clusters. Preferably, the grouping is selected so as to be suitable for the system of the control device to be tested, in particular a bus system.

The properties, protocols, hardware components, terminals, and protocol implementations can differ from one another depending on the communication technology. By way of example, a control device or a simulation program requires different properties, hardware components, terminals, and/or protocol implementations for a CAN interface than for an Ethernet interface.

In a further aspect, the invention relates to a system for generating an executable simulation program and simulating control device communication between a control device to be tested and at least one further control device. The system comprises:
 a database,
 a data processing unit, and
 a bus or network (e.g., an Ethernet network.)
In addition, the system comprises means for carrying out a method according to any of the above-described embodiments.

By way of example, the system can comprise a closed system in which all the components are permanently installed. Alternatively, the system can comprise a system having exchangeable components. The components can be adapted depending on the task and/or according to the control device to be tested.

The system does not comprise any further control device since the communication therewith is merely simulated. For the simulation, the at least one further control device need not be physically present.

The data processing unit is, for example, a standard desktop computer such as a Windows PC. Either the control device communication is simulated on the data processing unit, or the generated simulation program is sent by the data processing unit to a simulator (e.g., an HIL simulator) and simulated therein.

In one embodiment, the system comprises an expandable storage element, in particular a bulk storage device, that can be swapped for other storage devices having more storage capacity. In addition or alternatively, the system can be configured to accommodate further storage elements in order to expand the storage space.

Advantageously, an expandable storage element means that the system can accommodate and/or store different descriptions over time. Particularly in the case of a plurality of control devices to be tested having extensive descriptions of the interfaces, the advantage is produced whereby the system can provide retrofittable storage space requirements for more or more complex descriptions.

In a further aspect, the invention relates to a computer program product for generating an executable simulation program and simulating control device communication between a control device to be tested and at least one further control device, comprising means for carrying out the method according to any of the above-described embodiments and being configured to be executed by an above-described system.

FIG. 1 is a schematic illustration of simulated control device communication 50 between a control device 10 to be tested and a further control device 20.

The control device 10 to be tested comprises four interfaces 12, 14, 16 and 18. Normally, a typical control device comprises significantly more interfaces. The four interfaces 12, 14, 16 and 18 shown here are intended for illustrating the principle of the invention and should not be taken as being exhaustive. The interfaces 12, 14, 16 and 18 can, for example, be the description of a CAN frame for a CAN bus.

The four interfaces 12, 14, 16 and 18 can be configured as transmit and/or receive interfaces. For example, the interfaces 12 and 14 are transmit interfaces and the interfaces 16 and 18 are receive interfaces. By way of example, the interface 14 could be provided by an interface description for CAN bus communication and be denoted by "CAN-Frame1_TX", where TX stands for "transmit" so that it is clear that it is a transmit interface.

The further control device 20 is simulated by simulating its interfaces. When simulating the control device communication 50, the input and output values for the individual interfaces are simulated, for which purpose the description of the interfaces is necessary. The further control device 20 therefore need not be physically present for the simulation of the control device communication 50. To create the simulation program, it is sufficient that it is known which interfaces the further control device 20 has.

In the example shown in FIG. 1, the further control device 20 comprises three interfaces, which are generated as interface elements 24, 26 and 28. When creating the interface elements 24, 26 and 28, only interface elements that form a counterpart interface to the interfaces 12, 14, 16 and 18 are generated. The further control device can still have further interfaces that are not shown. The further interfaces of the further control device 20 are irrelevant for the simulation of the control device communication 50.

The interface element 24 has been generated as a counterpart interface to the interface 14, as shown by the identical hatching. If, for example, the interface 14 is the transmit interface "CAN-Frame1_TX", then the interface element 24 is a receive interface and is denoted, for example, by "CAN-Frame1_RX", where RX stands for "receive" and thus denotes a receive interface.

Instead of CAN messages, the interfaces can, for example, also be Ethernet messages for an Ethernet network or the like that are transmitted via socket connections.

The interface element 26 has been generated as a counterpart interface to the interface 16. If, for example, the interface 16 is a receive interface, then the interface element 26 is a transmit interface. The pairing of the interface 16 with the interface element 26 has likewise been illustrated by identical hatching.

Similarly to the other illustrated interfaces 14 and 16 and interface elements 24 and 26, the interface 18 and the interface element 28 also form a communicating pair. In the control device communication 50 shown, the interface 12 is not required since the further control device 20 is not configured for communication with the interface 12.

Figure 2:
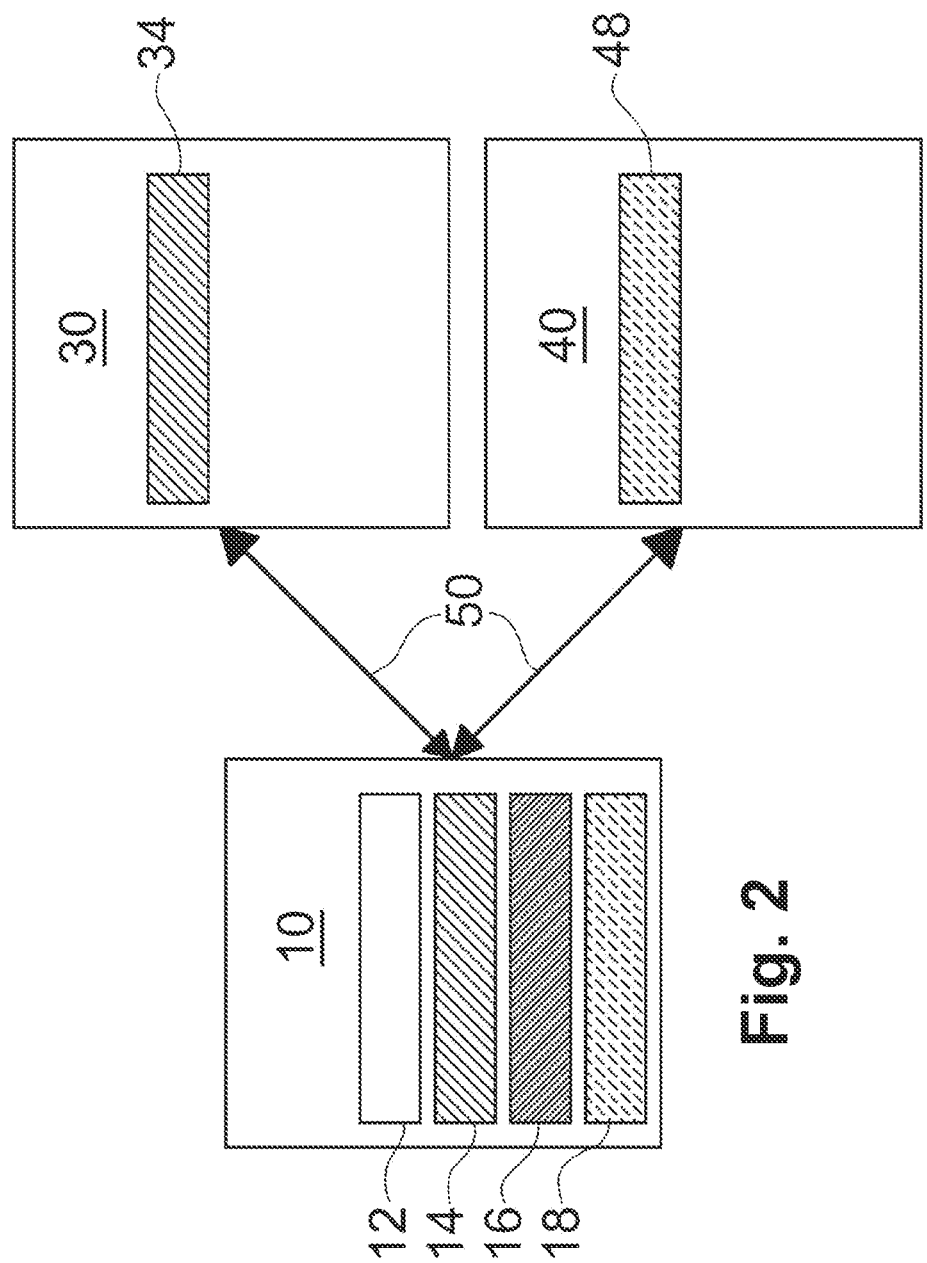
FIG. 2 is a schematic illustration of further simulated control device communication between a control device to be tested and two further control devices.

The simulation of the control device communication 50 can involve the control device 10 to be tested communicating with a plurality of further control devices, as shown in FIG. 2. In the embodiment shown, the control device 10 to be tested communicates with the further control device 30 and the further control device 40.

According to the description of its interfaces, the further control device 30 comprises an interface by which it can communicate with the control device 10 to be tested. Therefore, the interface element 34 is generated as a counterpart interface to the interface 14. Similarly, the further control device 40 likewise comprises just one interface by which it can communicate with the control device to be tested. Therefore, the interface element 48 is generated as a counterpart interface to the interface 18.

In the embodiment shown in FIG. 2, the interfaces 12 and 16 are not taken into account in the simulation of the control device communication 50 since the further control devices 30 and 40 are not configured to communicate with the interfaces 12 and 16.

Figure 3:
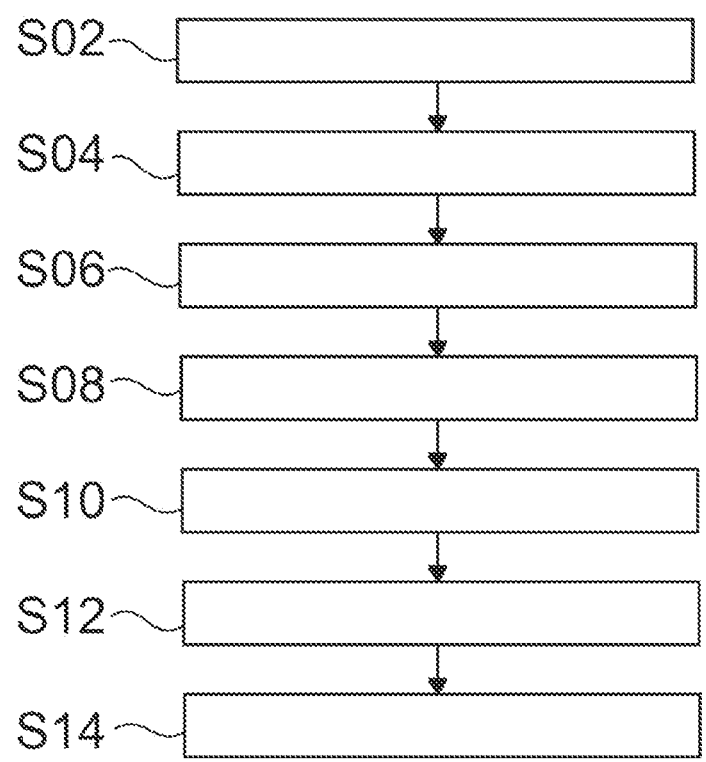
FIG. 3 is a schematic illustration of a method for creating and simulating control device communication.

FIG. 3 shows the schematic sequence of the method for generating an executable simulation program and simulating control device communication between a control device to be tested and at least one further control device, according to one embodiment.

In a first step S02, a description of the interfaces of a control device to be tested is transferred to a database. The transferring can in particular involve digital transmission. In the transferred description, the database identifies, in step S04, the interfaces of the control device to be tested. In other words, the database searches for all the interfaces that the control device to be tested makes available for communicating with the at least one further control device.

In step S06, the counterpart interfaces are then generated in the form of interface elements in accordance with the identified interfaces of the control device to be tested. An interface element is generated as a transmit interface for each receive interface of the control device to be tested, and an interface element is generated as a receive interface for each transmit interface of the control device to be tested. After being generated, the generated interface elements are stored in the database in step S08.

In a subsequent step S10, the database provides a configuration for the simulation of the control device communication, which configuration comprises the generated interface elements. An executable simulation program is generated from the provided configuration in step S12. The executable simulation program is preferably generated by a code generator.

In a final step S14, the control device communication is simulated using the simulation program. In the process, it is tested whether the communication between the control device to be tested and the at least one further control device is functioning properly, or whether the interfaces of the control device to be tested need adapting.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 Control device to be tested
12 Interface
14 Interface
16 Interface
18 Interface
20 Further control device
24 Interface element
26 Interface element
28 Interface element
30 Further control device
34 Interface element
40 Further control device
48 Interface element
50 Control device communication
S02 Transferring the description
S04 Identifying the interfaces
S06 Generating the interface elements
S08 Storing the interface elements in the database
S10 Providing the configuration
S12 Generating the simulation program
S14 Simulating the control device simulation

The invention claimed is:

1. A system, comprising:
a hardware-in-the-loop (HIL) simulator;
a computer connected to the HIL simulator;
a control device to be tested, wherein the control device has at least one transmit interface and at least one receive interface; and
a database configured to:
  receive a description of the at least one transmit interface of the control device and the at least one receive interface of the control device;
  identify, from the description, transmit and receive interfaces of the control device;
  generate a respective receive interface element corresponding to a respective receive interface of at least one further control device to be tested for each identified transmit interface of the control device;
  generate a respective transmit interface element corresponding to a respective transmit interface of the at least one further control device to be tested for each identified receive interface of the control device;

store the generated receive and transmit interface elements in the database; and provide a configuration for simulating communication between the control device and the at least one further control device to the computer, wherein the configuration includes at least one generated receive interface element of the at least one further control device corresponding to the at least one transmit interface of the control device and at least one generated transmit interface element of the at least one further control device corresponding to the at least one receive interface of the control device;

wherein the computer is configured to generate, based on the configuration, an executable simulation program for simulating the communication between the control device and the at least one further control device; and wherein the HIL simulator is configured to test the control device by executing the executable simulation program, wherein the execution of the executable simulation program includes communication between the HIL simulator and the control device corresponding to simulated communication between the control device and the at least one further control device.

2. The system according to claim 1, wherein the generated interface elements correspond to interfaces of the control device for which no counterpart interfaces have been identified.

3. The system according to claim 1, wherein the generated interface elements are labeled as automatically generated interface elements.

4. The system according to claim 1, wherein the interface elements of the at least one further control device are generated as restbus interfaces for an HIL simulation.

5. The system according to claim 1, wherein the generated interface elements of the at least one further control device are grouped based on communication technology.

6. The system according to claim 1, wherein the computer comprises the database.

7. The system according to claim 1, wherein the control device is an automobile control device; and wherein the at least one further control devices comprises at least one of: an on-board computer, a navigation device, a brake controller of an anti-lock braking system (ABS), a light controller, or a fuel pump controller.

8. A system, comprising:
a computer;
a control device to be tested, wherein the control device has at least one transmit interface and at least one receive interface; and
a database configured to:
receive a description of the at least one transmit interface of the control device and the at least one receive interface of the control device;
identify, from the description, transmit and receive interfaces of the control device;
generate a respective receive interface element corresponding to a respective receive interface of at least one further control device to be tested for each identified transmit interface of the control device;
generate a respective transmit interface element corresponding to a respective transmit interface of the at least one further control device to be tested for each identified receive interface of the control device;
store the generated receive and transmit interface elements in the database; and
provide a configuration for simulating communication between the control device and at least one further control device, wherein the configuration includes at least one generated receive interface element of the at least one further control device corresponding to the at least one transmit interface of the control device and at least one generated transmit interface element of the at least one further control device corresponding to the at least one receive interface of the control device;

wherein the computer is configured to:
generate, based on the configuration, an executable simulation program for simulating the communication between the control device and the at least one further control device; and
test the control device by executing the executable simulation program, wherein the execution of the executable simulation program includes communication between the computer and the control device corresponding to simulated communication between the control device and the at least one further control device.

9. The system according to claim 8, wherein the generated interface elements correspond to interfaces of the control device for which no counterpart interfaces have been identified.

10. The system according to claim 8, wherein the generated interface elements are labeled as automatically generated interface elements.

11. The system according to claim 8, wherein the interface elements of the at least one further control device are generated as restbus interfaces for a hardware-in-the-loop (HIL) simulation.

12. The system according to claim 8, wherein the interface elements of the at least one further control device are generated for a rapid control prototyping simulation for a function of the control device to be tested.

13. The system according to claim 8, wherein the generated interface elements of the at least one further control device are grouped based on communication technology.

14. The system according to claim 8, wherein the computer comprises the database.

15. The system according to claim 8, wherein the control device is an automobile control device; and wherein the at least one further control devices comprises at least one of: an on-board computer, a navigation device, a brake controller of an anti-lock braking system (ABS), a light controller, or a fuel pump controller.

* * * * *